United States Patent [11] 3,617,552

| [72] | Inventors | Robert G. Will<br>Munster;<br>James F. Grutsch, Hammond, both of Ind. |
|---|---|---|
| [21] | Appl. No. | 20,510 |
| [22] | Filed | Mar. 18, 1970 |
| [45] | Patented | Nov. 2, 1971 |
| [73] | Assignee | Standard Oil Company<br>Chicago, Ill. |

[54] OIL-WATER SEPARATING PROCESS
5 Claims, 2 Drawing Figs.

[52] U.S. Cl................................................. 210/23,
210/30, 210/40, 210/400, 210/DIG. 21
[51] Int. Cl........................................................E02b 15/04,
B01d 23/24
[50] Field of Search............................................ 210/40,
170, 242, 400, 489, 490, 523, DIG. 21, 23, 30

[56] References Cited
UNITED STATES PATENTS
2,742,160   4/1956   Fogwell....................... 210/489 X

| 3,210,229 | 10/1965 | Feine........................... | 210/489 X |
| 3,314,540 | 4/1967 | Lane............................ | 210/DIG. 21 |
| 3,487,927 | 1/1970 | Yahnke........................ | 210/40 X |

Primary Examiner—Samih N. Zaharna
Attorneys—Arthur G. Gilkes, William T. McClain and John J. Connors ABSTRACT: Oil-contaminated water is purified using apparatus having a revolving polyurethane foam belt which is mounted on an incline relative to the horizontal. The contaminated water moves past and through the revolving belt or the belt is mounted on a boat which moves the belt through the water. In either case, as the belt and water move relative to each other, the oil-contaminated water filters through the belt and is purified. The belt is then squeezed twice. First gently to remove water, and then vigorously to remove oil. The belt may include inner and outer abutting sections which are reinforced by a network of threads. The outer section which first contacts the contaminated water has a larger pore structure than the inner section.

PATENTED NOV 2 1971 3,617,552

INVENTORS.
Robert G. Will
James F. Grutsch

BY John F. Connors
ATTORNEY

OIL-WATER SEPARATING PROCESS

BACKGROUND

In U.S. Pat. No. 3,487,927, Robert L. Yahnke has disclosed oil and water separation equipment which relies on filtration principles. This unique piece of equipment uses, as the filtration medium, a foamed polyurethane belt trained about a perforated drum that is rotatably mounted in a water holding tank into which oil-contaminated water is pumped. A differential in pressure is established across the belt and the contaminated water flows through the belt, with the oil being absorbed by the belt. Absorbed oil is subsequently removed from the belt and collected.

THE INVENTION

We have now improved the design of Yahnke's equipment in several ways: First, we use a foamed polyurethane belt which has been reinforced so that it can withstand long periods of use. Second, the foamed belt of our design has large and small pore sections which make the belt more readily adapted to filter oils with a wide range of viscosities. Third, we have found that a differential in pressure across the belt can be established in a simplified manner by mounting the belt on an incline and moving the belt through the water and/or moving the water past and through the belt. Thus the apparatus of our invention can be readily mounted on a boat or in a sluice. And fourth, our apparatus is particularly adapted to remove very thin oil slicks from the surface of water, for example, slicks of 25 barrels per square mile or less.

Our apparatus includes revolving belt means made of regenerable porous filter material which selectively absorbs oil. The belt means is mounted in an inclined position relative to the horizontal with the belt means partially submerged in the water. As the belt means moves through a closed looped path, regenerating means removes absorbed oil from the belt means. Preferably the belt means is inclined relative to the horizontal at an angle ranging from about 30° to about 60°, and reinforced to prevent buckling when the water presses against it. The preferred means for removing absorbed oil include a pair of squeegee roll means which press against the belt means to squeeze water and oil therefrom. One of the squeegee roll means only squeezes the belt means gently so that substantially all the water is removed but none of the oil. The other squeegee roll means squeezes the belt more vigorously so that substantially all absorbed oil is removed therefrom.

Our improved belt useful for filtering oil from water includes first and second abutting sections of regenerable porous filter material which selectively absorbs oil. The first section has a larger pore structure than the second section. Heavy viscous oil will be trapped in the first section and lighter more fluid oils will be trapped in the second section. A network of reinforcing threads adheres to the exposed surfaces of the sections, and a network of such reinforced threads also adheres to the inside abutting surfaces of said sections. Preferably, the first section has about 45 or less pores per linear inch, and the second section has about 60 or more pores per linear inch. The pores of the second section are substantially smaller than the pores of the first section.

PREFERRED EMBODIMENT

Apparatus 10 of our invention may be mounted in a stationary position in a stream of water so that oil-contaminated water flows past the apparatus. Or apparatus 10 may be mounted on a boat so that it can be moved through a body of water such as a lake or even the open seas. In either case, the oil-contaminated water and apparatus 10 move relative to each other at speeds ranging between about one-half and about 3 miles per hour.

Figure 1:
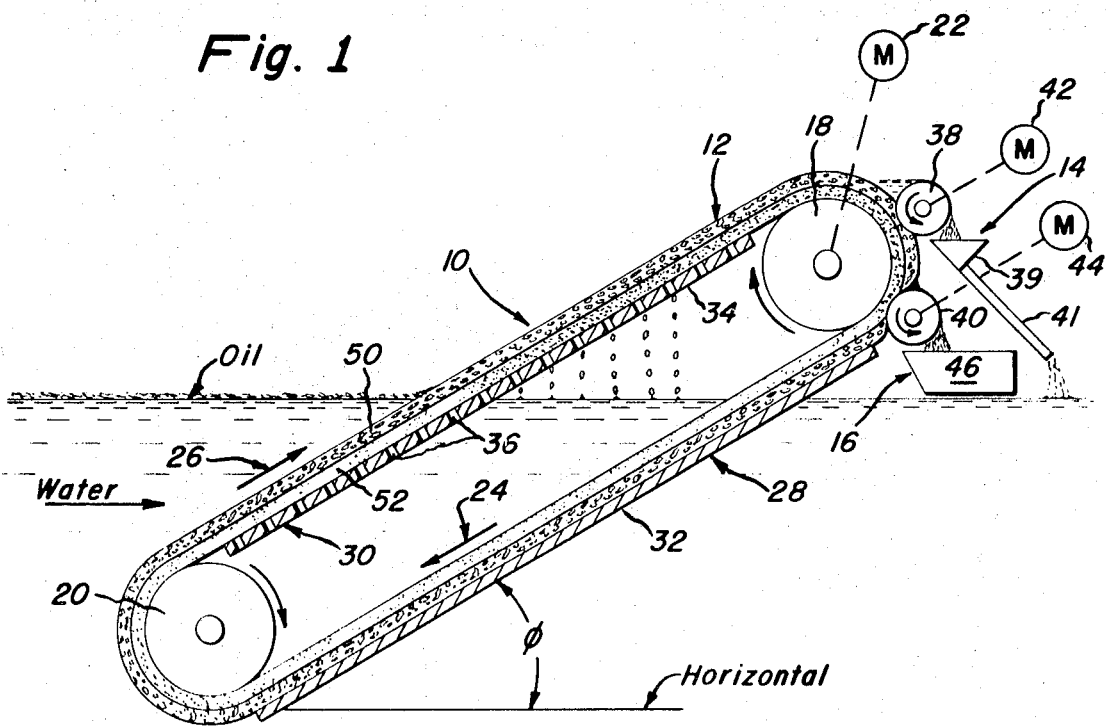
FIG. 1 is a schematic cross-sectional view of our apparatus removing oil from water.

As illustrated in FIG. 1, our apparatus 10 has three basic components: (a) belt 12 made of a regenerable porous filter material which selectively absorbs oil, (a suitable filter material is foamed polyurethane), (b) regenerating means 14 which removes absorbed oil and water from belt 12, and (c) collecting means 16 which collects oil removed from belt 12. In accordance with an important structural feature of our invention, belt 12 inclined, and the angle of inclination Φ relative to the horizontal preferably ranges from about 30° to about 60°.

Belt 12 is trained about drive roller 18 and idler roller 20. These rollers 18 and 20 are vertically offset relative to each other, and drive roller 18 is above the water's surface and idler roller 20 is below the water's surface. Motor 22 turns drive roller 18 in a clockwise direction as viewed in FIG. 1 so that belt 12 moves through a closed looped path with flight 24 of the belt dipping into the water and flight 26 leaving the water. Under some circumstances it may be necessary or desirable to also drive roller 20.

Guide means 28 and 30 are provided so that the belt will not stretch due to the pressure exerted on it by the water. Guide means 28 includes a solid plate member 32 which is adjacent the outside of the closed looped path of belt 12 and which extends transverse to flight 24, and guide means 30 includes a screen or perforated plate 34 which is inside the looped path of belt 12 and which extends transverse to flight 26. Plate 32 is only wide enough to support belt 12, i.e., it is laterally coextensive with flight 24. Braces may be used to attach plate 32 to a boat or sluice. Perforations 36 in plate 34 are substantially coextensive with the area covered by flight 26; however, the ends (not shown) of plate 34 are solid and they extend beyond the periphery of flight 26. These solid ends are attached to a boat or sluice as the case may be. Both plates 32 and 34 are preferably coated with a suitable material that reduces the coefficient of friction between the belt's surfaces and the plates. A suitable material would be a fluorocarbon polymer such as Teflon.

The regenerating means 14 preferably includes a pair of squeegee rolls 38 and 40 which press against belt 12. Motors 42 and 44 are coupled to squeegee rolls 38 and 40, respectively, and these motors turn these rolls in a counterclockwise direction as viewed in FIG. 1. Roll 38 does not press against belt 12 with the same force as roll 40. It only presses belt 12 gently so that substantially all the water is removed from the belt but none of the oil. Removed water flows over roll 38 into trough 39, and then out pipe 41, returning to the main body of water. Roll 40 presses against belt 12 with a greater force than roll 38. This removes absorbed oil, which then flows into collecting means 16 such as trough 46. Oil in trough 46 is then pumped into a suitable storage tank.

Figure 2:
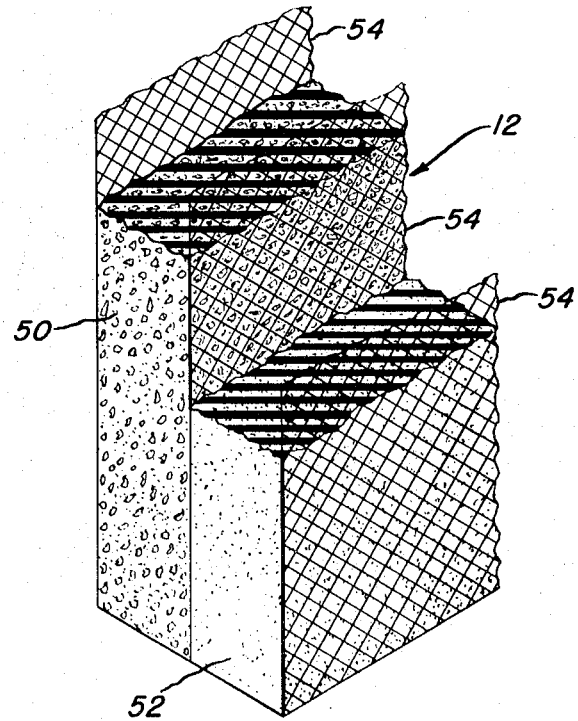
FIG. 2 is an enlarged fragmentary view of the novel foamed polyurethane belt of our invention.

As illustrated in FIG. 2, belt 12 is preferably made up of two or more sections 50 and 52. Section 50 faces the outside of the closed looped path and section 52 faces the inside of the closed looped path. Thus oil-contaminated water first flows through section 50 and then through section 52. Section 50 has a larger pore structure than section 52 so that most heavy, viscous oils are absorbed in this section 50 before they can penetrate into section 52. Lighter, fluid oils are absorbed in section 52. Preferably section 50 has 45 or less pores per linear inch. Section 52 preferably has 60 or more pores per linear inch. To make belt 12 more durable, networks 54 of nylon threads are glued to the exposed surfaces of belt 12 and between abutting surfaces of sections 50 and 52. Threads 56 are substantially perpendicular to each other and they provide a ¼–⅜-inch mesh.

In operation, apparatus 10 is either moved through a body of water or disposed in a stream of flowing water. This will insure that oil-contaminated water impinges against flight 26. Due to the relative motion of the oil-contaminated water and apparatus 10, and with the aid of upward movement of flight 26, contaminated water is lifted upwardly so that a differential in pressure is established across belt 12. This differential in pressure causes the oil-contaminated water to flow through belt 12 and through perforations 36 in plate 34. As the water flows through belt 12, oil and some water are trapped in the pores of the belt. When belt 12 engages roll 38 virtually all the absorbed water is squeezed from the belt, but the oil is retained. When belt 12 engages roll 40 virtually all the absorbed oil is caught in trough 46 and pumped into a storage tank. The buckling and stretching tendency of belt 12 caused by the water pressure is counteracted by the reinforcement provided by networks 54 and guide means 28 and 30.

I claim:

1. A process for removing oil from water, comprising the steps of:

filtering the oil and water through a regenerable porous filter member which selectively absorbs oil and which includes a large pore section and a small pore section, said large pore section having about 45 or less pores per linear inch and said small pore section having about 60 or more pores per linear inch, the pores in the small pore section being substantially smaller than the pores in the large pore section, the large pore section being adapted to trap heavy viscous oil and the small pore section being adapted to trap lighter oils, said oil and water first flowing through the large pore section and then through the small pore section under the influence of a differential in pressure established across said member;

regenerating the filter member by removing absorbed oil therefrom; and collecting absorbed oil removed from the filter member.

2. The process of claim 1 wherein the filter member is foamed polyurethane.

3. A process for removing oil from water, comprising the steps of:

3. A process for removing oil from water, comprising the steps of:

filtering the oil and water through a rotating, inclined, continuous belt member made of a regenerable porous filter material, said filter material including a large pore section having about 45 or less pores per linear inch and a small pore section having about 60 or more pores per linear inch; the pores in the small pore section being substantially smaller than the pores in the large pore section, the large pore section being adapted to trap heavy viscous oil and the small pore section being adapted to trap lighter oils; and removing absorbed oil from the belt member and collecting said removed absorbed oil.

4. The process of claim 3 wherein the belt member is inclined relative to the horizontal at an angle of from about 30° to about 60°.

5. The process of claim 3 wherein the water with associated oil and the belt member move relative to each other at speeds ranging between about one-half and about 3 miles per hour.

* * * * *